(12) United States Patent
Yamaguchi

(10) Patent No.: US 11,329,534 B2
(45) Date of Patent: May 10, 2022

(54) TEMPERATURE ABNORMALITY DETECTION DEVICE AND MOTOR

(71) Applicant: FANUC CORPORATION, Yamanashi (JP)

(72) Inventor: Akira Yamaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1 day.

(21) Appl. No.: 16/999,360

(22) Filed: Aug. 21, 2020

(65) Prior Publication Data

US 2021/0083557 A1 Mar. 18, 2021

(30) Foreign Application Priority Data

Sep. 18, 2019 (JP) .............................. JP2019-169586

(51) Int. Cl.
*H02K 11/25* (2016.01)
*H02K 11/21* (2016.01)

(52) U.S. Cl.
CPC .............. *H02K 11/25* (2016.01); *H02K 11/21* (2016.01)

(58) Field of Classification Search
CPC ......... H02K 11/25; H02K 11/21; H02K 11/33
USPC .................................................. 310/68 C, 71
See application file for complete search history.

(56) References Cited

U.S. PATENT DOCUMENTS

2017/0019050 A1* 1/2017 Miyama .................. H02P 27/08

FOREIGN PATENT DOCUMENTS

JP 2008167628 A * 7/2008
JP 2016-226089 A 12/2016

OTHER PUBLICATIONS

Machine Translation JP2008167628 (Year: 2008).*

* cited by examiner

*Primary Examiner* — Jose A Gonzalez Quinones
(74) *Attorney, Agent, or Firm* — Studebaker & Brackett PC

(57) ABSTRACT

A temperature abnormality detection device that detects an abnormality in temperature of a motor including a stator and a rotor, includes: a temperature acquisition unit that acquires a temperature of a winding of the stator; a speed acquisition unit that acquires a rotation speed of the rotor; an allowable value changing unit that changes an allowable value for the temperature of the winding in accordance with an acquired rotation speed of the rotor; a comparison unit that compares an acquired temperature of the winding with a changed allowable value for the temperature of the winding based on the rotation speed of the rotor; and an output control unit that controls an external output of a warning signal indicating an excess of the temperature of the winding with respect to the allowable value.

7 Claims, 4 Drawing Sheets

TEMPERATURE ABNORMALITY DETECTION DEVICE AND MOTOR

This application is based on and claims the benefit of priority from Japanese Patent Application No. 2019-169586, filed on 18 Sep. 2019, the content of which is incorporated herein by reference.

BACKGROUND OF THE INVENTION

Field of the Invention

The present invention relates to a temperature abnormality detection device and a motor.

Related Art

Conventionally, for the purpose of protecting a motor from overheating, temperature abnormality detection devices for detecting the temperature of the motor have been known. In a temperature abnormality detection device, for example, a temperature detection element (a thermistor, etc.) is installed in a winding. In a case in which the temperature detected using the temperature detection element exceeds a predetermined temperature (temperature protection level), the temperature abnormality detection device stops the operation of the motor. For example, as a device for controlling the operation of the motor using the temperature of the winding, a temperature estimation device for estimating the temperature of the synchronous motor from the temperature of the winding has been proposed (e.g., see Japanese Unexamined Patent Application, Publication No. 2016-226089).

Patent Document 1: Japanese Unexamined Patent Application, Publication No. 2016-226089

SUMMARY OF THE INVENTION

With the overheating protection of a motor, it is preferable for components other than the winding (rotor, bearing, etc.) to also be protected. In this regard, the temperature for stopping the motor is determined in advance as a temperature that allows all components of the motor to be protected. In the temperature estimation device of Japanese Unexamined Patent Application, Publication No. 2016-226089, since the temperature of the synchronous motor is estimated from the temperature and the rotation speed of the winding, it is possible to protect the components other than the winding.

Incidentally, when the motor operates at high speed, the temperatures of the rotor and bearings become high. Therefore, the temperature protection level is sometimes set lower than the winding allowable temperature. Thus, it is possible to effectively protect the rotor and bearings.

However, when the motor is used at low speed, the temperature increase of the rotor and bearings is small when compared to the operation of the motor at high speed. Therefore, in the temperature protection level set for the high-speed operation, the protection of the motor may become excessive. As a result, there has been concern over operation of the motor being unnecessarily limited. Therefore, it is preferable to control the operation of the motor appropriately while protecting the components other than the winding.

The first aspect of the present disclosure relates to a temperature abnormality detection device that detects an abnormality in temperature of a motor including a stator and a rotor, the temperature abnormality detection device including: a temperature acquisition unit that acquires a temperature of a winding of the stator; a speed acquisition unit that acquires a rotation speed of the rotor; an allowable value changing unit that changes an allowable value for the temperature of the winding in accordance with an acquired rotation speed of the rotor; a comparison unit that compares an acquired temperature of the winding with a changed allowable value for the temperature of the winding based on the rotation speed of the rotor; and an output control unit that controls an external output of a warning signal indicating an excess of the temperature of the winding with respect to the allowable value.

The second aspect of the present disclosure relates to a motor including the temperature abnormality detection device according to the first aspect; a stator including a winding; and a rotor.

According to the present disclosure, a temperature abnormality detection device that is able to appropriately control the operation of a motor while protecting the components other than the winding, and a motor are provided.

DETAILED DESCRIPTION OF THE INVENTION

Hereinafter, a temperature abnormality detection device 10 and a motor 1 according to each embodiment of the present invention will be described with reference to FIGS. 1 to 4. The motor 1 according to each embodiment includes the temperature abnormality detection device 10 for controlling the motor 1 by detecting the temperature of the winding of a stator. The temperature abnormality detection device 10 improves the flexibility of control of the motor 1 in accordance with the operating status of the motor 1 in accordance with the rotation speed of the motor 1 by changing the allowable value (alarm level) of the temperature of the winding.

First Embodiment

Figure 1:
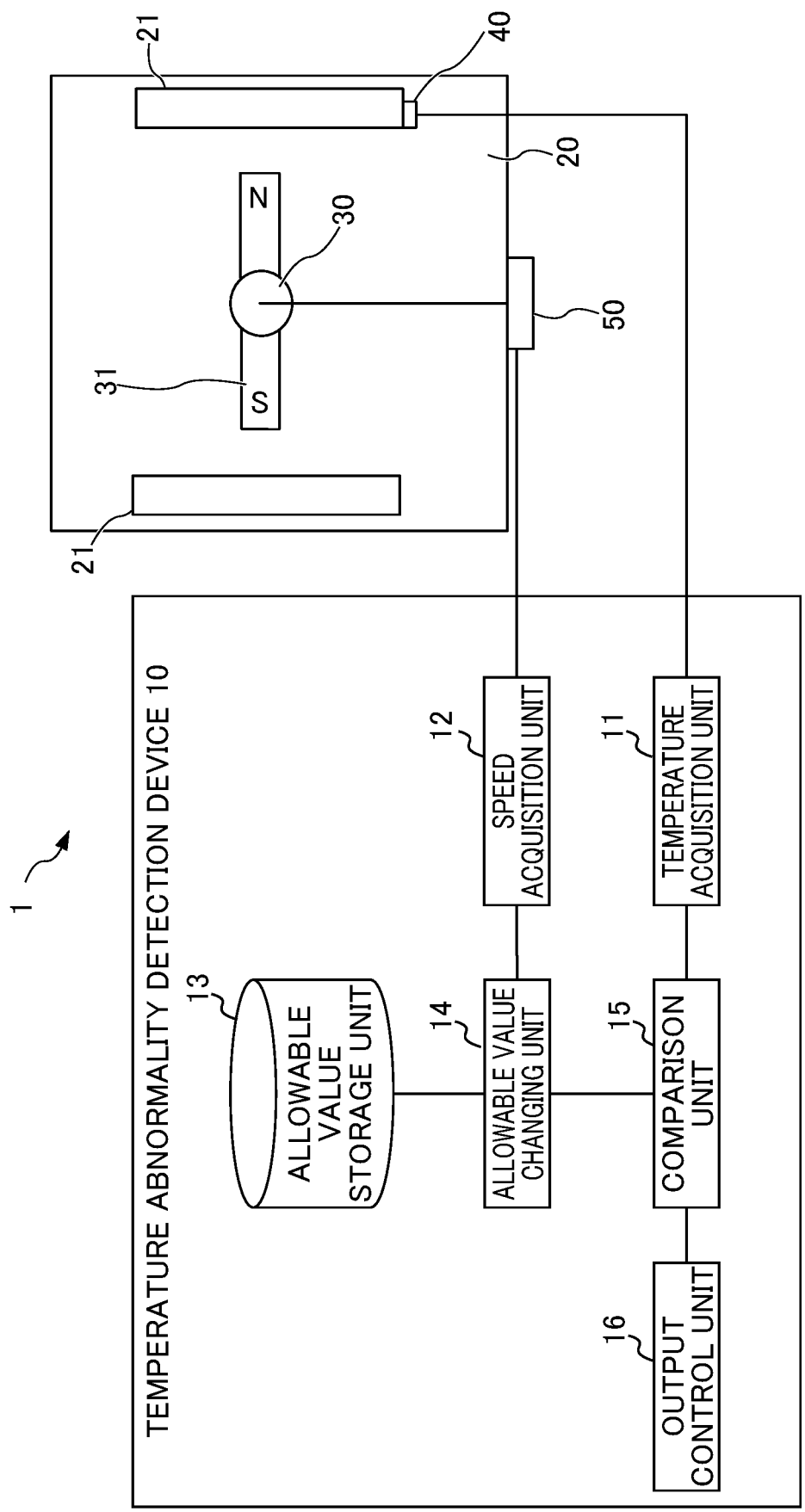
FIG. 1 is a block diagram showing the configurations of a temperature abnormality detection device and a motor according to a first embodiment of the present disclosure.
Figure 2:
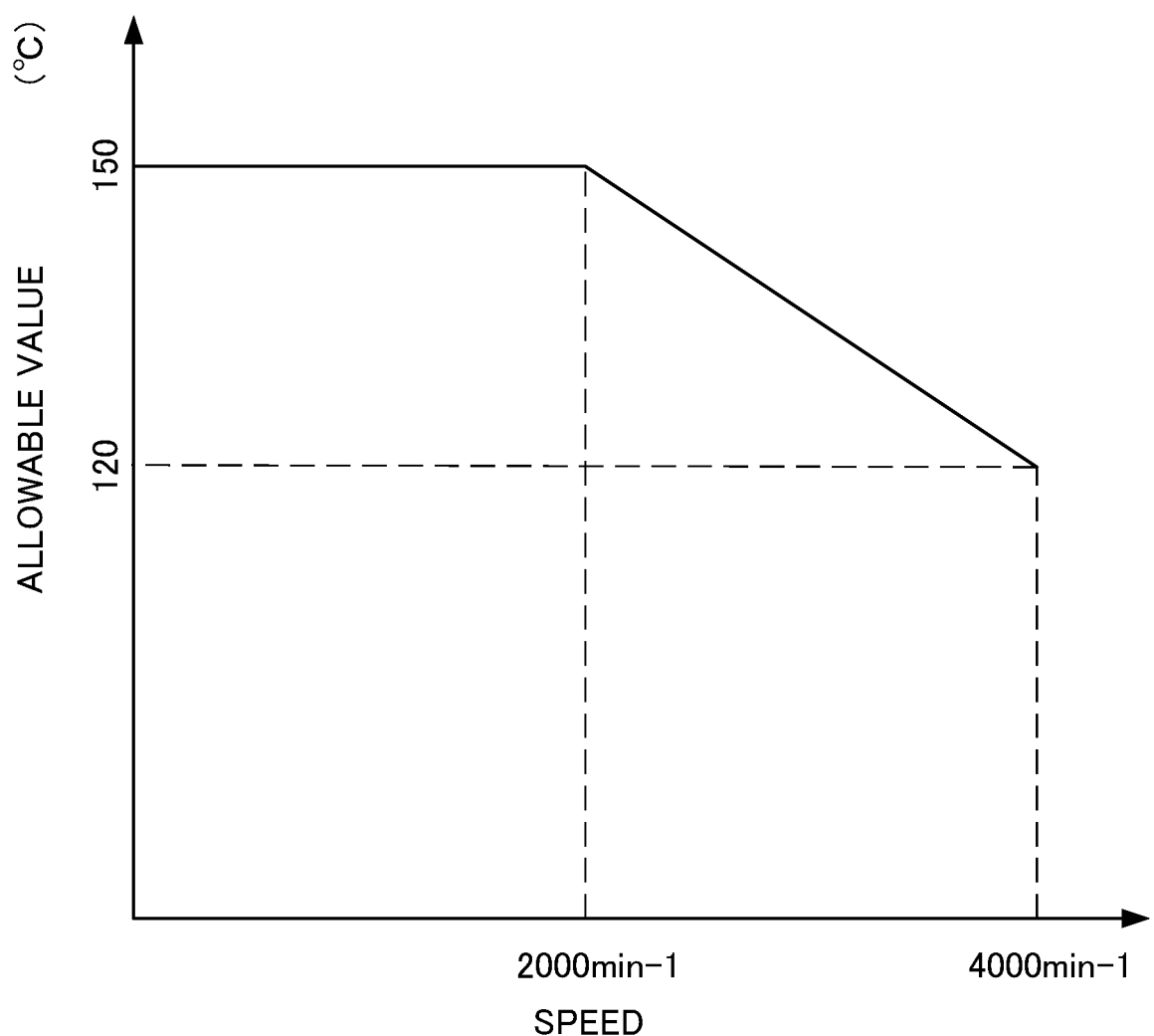
FIG. 2 is a graph showing the relationship between the rotation speed of a rotor and the allowable value changed by an allowable value changing unit of the temperature abnormality detection device of the first embodiment.
Figure 3:
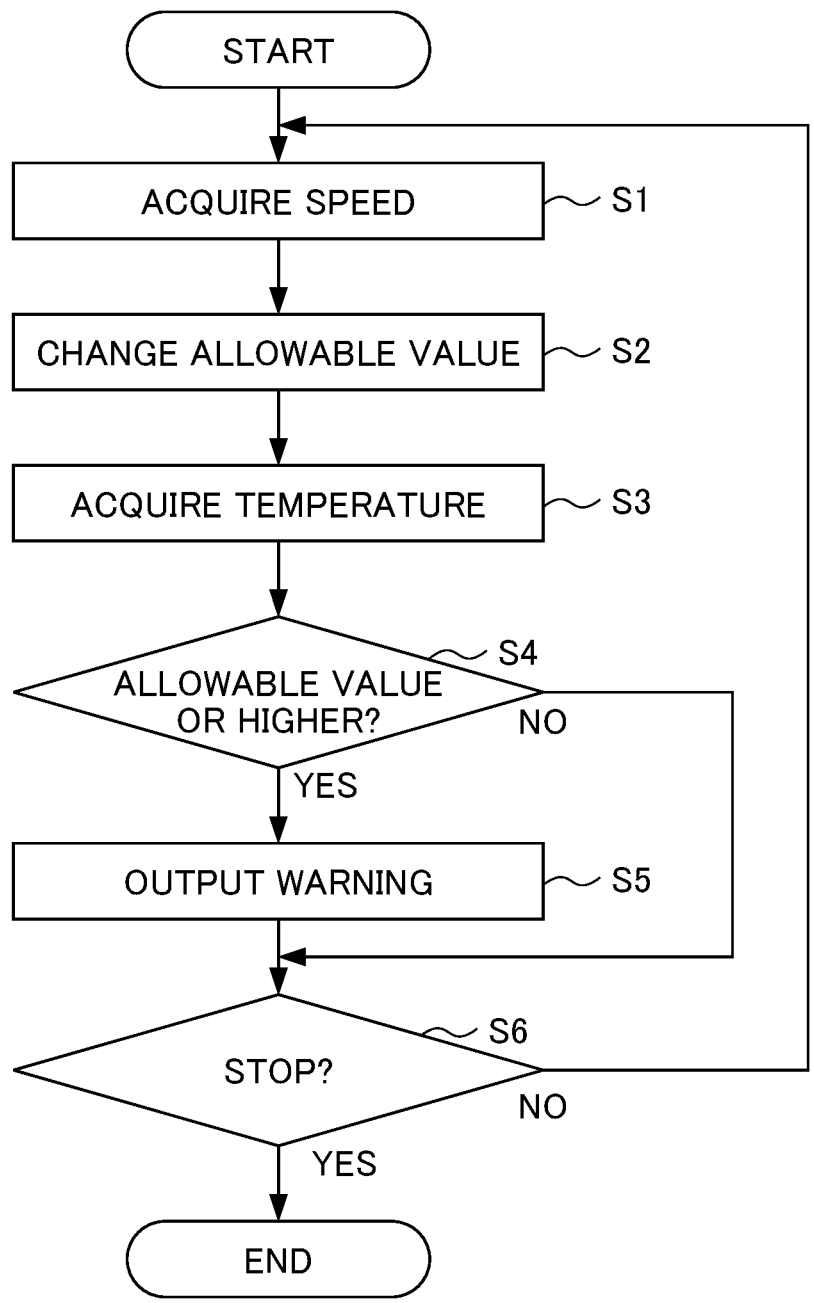
FIG. 3 is a flowchart showing the flow of operations of the temperature abnormality detection device and the motor of the first embodiment.

First, the temperature abnormality detection device 10 and the motor 1 according to the first embodiment of the present disclosure will be described with reference to FIGS. 1 to 3.

The motor 1 is, for example, a synchronous motor. As shown in FIG. 1, the motor 1 includes a stator 20, a rotor 30, and a temperature abnormality detection device 10.

The stator 20 is formed in a tubular shape. The stator 20 has a plurality of windings 21.

The rotor 30 is formed in a cylindrical shape. The rotor 30 is fixed and supported inside the stator 20. A sintered magnet 31 is disposed in the rotor 30, for example.

The temperature abnormality detection device 10 detects an abnormality in the temperature of the motor 1. Furthermore, the temperature abnormality detection device 10 outputs a signal to the outside when detecting an abnormality. As shown in FIG. 1, the temperature abnormality detection device 10 includes a temperature acquisition unit 11, a speed acquisition unit 12, an allowable value storage unit 13, an allowable value changing unit 14, a comparison unit 15, and an output control unit 16.

The temperature acquisition unit 11 is realized, for example, by the operation of a CPU. The temperature acquisition unit 11 acquires the temperature of the winding 21 of the stator 20. The temperature acquisition unit 11, for example, acquires the temperature of the winding 21 by using a temperature detection unit 40 attached to the winding 21. More specifically, the temperature acquisition unit 11 acquires the temperature of the winding 21 using a thermistor attached to the winding 21.

The speed acquisition unit 12 is realized, for example, by the operation of a CPU. The speed acquisition unit 12 acquires the rotation speed of the rotor 30. The speed acquisition unit 12, for example, acquires the rotation speed based on a signal outputted from a rotation angle detector 50 for detecting the rotation angle of the rotor 30.

The allowable value storage unit 13 is, for example, an auxiliary storage medium such as a hard disk. As shown in FIG. 2, the allowable value storage unit 13, for example, stores the data of the allowable value with respect to the rotation speed.

The allowable value changing unit 14 is realized, for example, by the operation of a CPU. The allowable value changing unit 14 changes the allowable value for the temperature of the winding 21 in accordance with the rotation speed of the rotor 30. In a case in which the rotation speed of the rotor 30 is faster, the allowable value changing unit 14 changes the allowable value for the temperature of the winding 21 to be lower. On the other hand, in a case in which the rotation speed of the rotor 30 is slower, the allowable value changing unit 14 changes the allowable value for the temperature of the winding 21 to be higher. The allowable value changing unit 14 changes the allowable value in accordance with the acquired rotation speed using, for example, the graph shown in FIG. 2. In the present embodiment, the allowable value changing unit 14 keeps the allowable value for the temperature of the winding 21 constant until the rotation speed of the rotor 30 reaches a predetermined magnitude. More specifically, the allowable value changing unit 14 changes the allowable value for the rotation speed of the rotor 30 being 2000 $\text{min}^{-1}$ or less to 150° C. Furthermore, for the allowable value for the rotation speed 2000 $\text{min}^{-1}$ or more and 4000 min or less of the rotor 30, the allowable value changing unit 14 changes the allowable value so as to gradually decrease from 150° C. to 120° C. as the rotation speed increases. At this time, the allowable value changing unit 14 changes the allowable value so as to reduce the allowable value linearly.

The comparison unit 15 is realized, for example, by the operation of a CPU. The comparison unit 15 compares the acquired temperature of the winding 21 with the changed allowable value for the winding 21 based on the rotation speed of the rotor 30. For example, the comparison unit 15 acquires the changed allowable value from the allowable value changing unit 14. Furthermore, the comparison unit 15 acquires the temperature of the winding 21 from the temperature acquisition unit 11. The comparison unit 15 determines whether the temperature of the acquired winding 21 has exceeded the allowable value.

The output control unit 16 is realized, for example, by the operation of a CPU. The output control unit 16 controls the external output of warning signal indicating the excess of the temperature of the winding 21 with respect to the allowable value. The output control unit 16 controls the output of the warning signal to an audio reproducing device such as a speaker (not shown) or a display device such as a display (not shown).

Next, the operation of the temperature abnormality detection device 10 and the motor 1 according to the present embodiment will be described with reference to the flowchart of FIG. 3. First, at the time of operation of the motor 1, the speed acquisition unit 12 acquires the rotation speed of the rotor 30 (Step S1). The speed acquisition unit 12 sends the acquired rotation speed to the allowable value changing unit 14.

Thereafter, the allowable value changing unit 14 reads the data of the allowable value with respect to the rotation speed from the allowable value storage unit 13. Furthermore, the allowable value changing unit 14 receives the rotation speed from the speed acquisition unit 12. The allowable value changing unit 14 changes the allowable value for the temperature of the winding 21 based on the received rotation speed and the data of the allowable value (Step S2). The allowable value changing unit 14 sends the changed allowable value to the comparison unit 15.

Then, the temperature acquisition unit 11 acquires the temperature of the winding 21 (Step S3). The temperature acquisition unit 11 sends the acquired temperature to the comparison unit 15.

Next, the comparison unit 15 compares the received allowable value with the received temperature of the winding 21 (Step S4). When the temperature of the winding 21 is the allowable value or higher (Step S4: YES), the processing proceeds to Step S5. On the other hand, when the temperature of the winding 21 is less than the allowable value (Step S4: NO), the processing proceeds to Step S6.

In Step S5, the comparison unit 15 sends a signal indicating an excess of the allowable value for the temperature of the winding 21 to the output control unit 16. The output control unit 16 controls the external output of the warning signal indicating the excess of the allowable value. Thereafter, the processing proceeds to Step S6.

In Step S6, it is determined whether the motor 1 has stopped or not. More specifically, the speed acquisition unit 12 acquires the rotation speed of the rotor 30. When the rotation speed of the rotor 30 is 0, the allowable value changing unit 14 determines that the motor 1 has been stopped (Step S6: YES). The present flow thereby ends. On the other hand, when the rotation speed of the rotor 30 is not 0, the allowable value changing unit 14 determines that the motor 1 is in operation (Step S6: NO). In this case, the processing returns to Step S1.

As described above, the temperature abnormality detection device 10 and the motor 1 according to the first embodiment have the following effects.

(1) A temperature abnormality detection device 10 that detects an abnormality in temperature of a motor 1 including a stator 20 and a rotor 30, includes: a temperature acquisition unit 11 that acquires a temperature of a winding 21 of the stator 20; a speed acquisition unit 12 that acquires a rotation speed of the rotor 30; an allowable value changing unit 14 that changes an allowable value for the temperature of the winding 21 in accordance with an acquired rotation speed of the rotor 30; a comparison unit 15 that compares an acquired temperature of the winding 21 with a changed allowable value for the temperature of the winding 21 based on the rotation speed of the rotor 30; and an output control unit 16 that controls an external output of a warning signal indicating an excess of the temperature of the winding 21 with respect to the allowable value. Since it is thereby possible to flexibly change the allowable value in accordance with the rotation speed of the rotor 30, it is possible to appropriately control the operation of the motor 1 while protecting the components other than the winding 21. Furthermore, since it is unnecessary to acquire a temperature other than the winding 21 such as that of the rotor 30 or bearings (not shown), it is possible to suppress an increase in the cost of the temperature abnormality detection device 10 and the motor 1.

(2) The allowable value changing unit 14 reduces the allowable value for the temperature of the winding 21 as the rotation speed of the rotor 30 becomes faster. Thus, when the rotation speed of the rotor 30 is relatively high, it is possible to change the allowable value for the temperature of the winding 21 in consideration of the temperature rise of the rotor 30 or bearings. Therefore, it is possible to appropriately detect the abnormal increase in temperature of the rotor 30 and bearings when the rotation speed of the rotor 30 is high, and thus it is possible to appropriately protect the motor 1.

(3) The allowable value changing unit 14 keeps the allowable value for the temperature of the winding 21 constant until the rotation speed of the rotor 30 reaches a predetermined magnitude. Thus, for example, when the rotation speed of the rotor 30 is slow, it is possible to change the allowable value most loosely. Therefore, it is possible to appropriately control the motor 1.

(4) The motor 1 includes the abovementioned temperature abnormality detection device 10, the stator 20 having the winding 21, and the rotor 30. Thus, it is possible to provide the temperature abnormality detection device 10 integrated with the motor 1.

Second Embodiment

Figure 4:
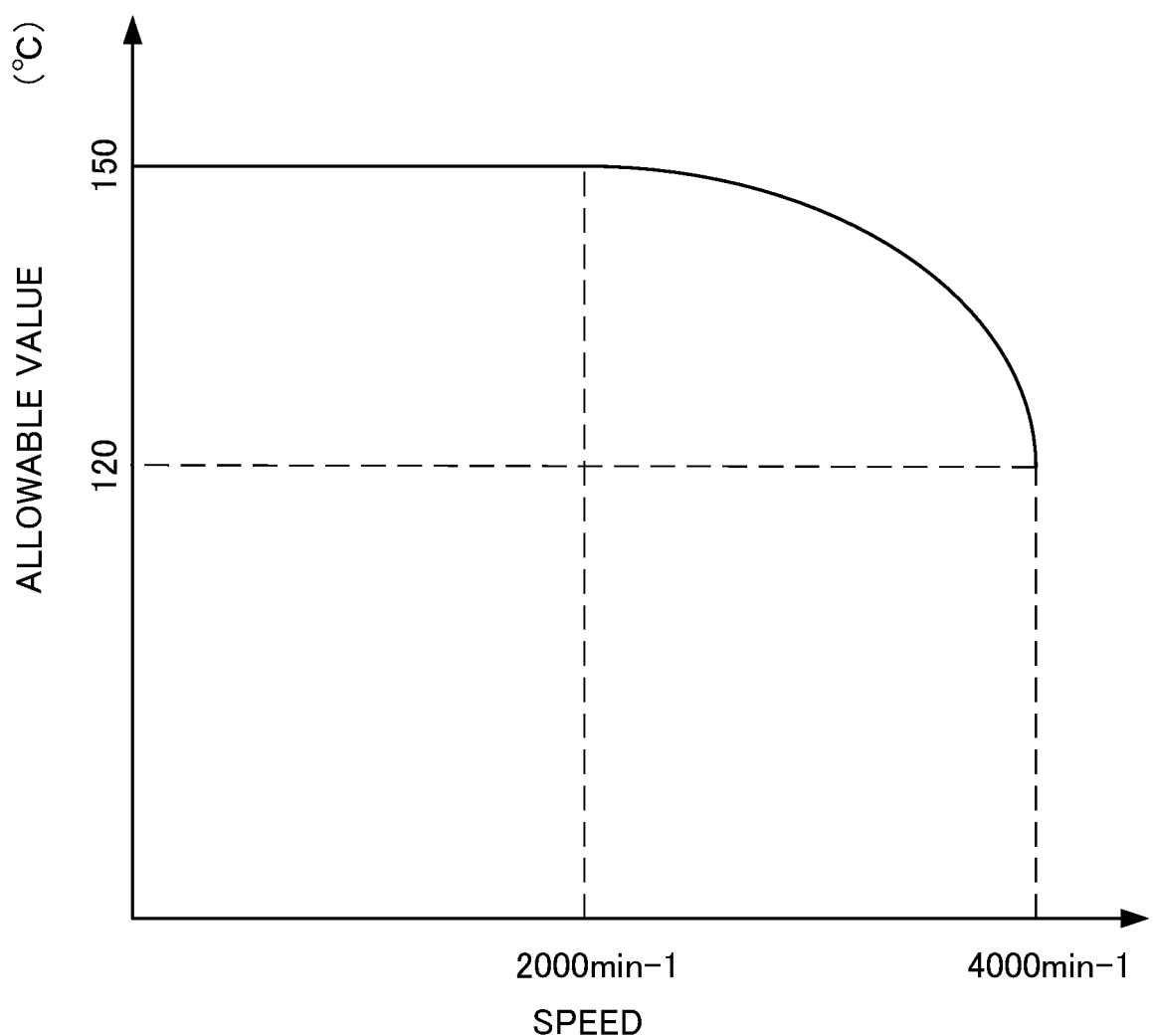
FIG. 4 is a graph showing the relationship between the rotation speed of a rotor and the allowable value changed by an allowable value changing unit of a temperature abnormality detection device according to a second embodiment of the present disclosure.

Next, a temperature abnormality detection device 10 and a motor 1 according to a second embodiment of the present disclosure will be described with reference to FIG. 4. In the description of the second embodiment, the same components as those of the above-described embodiment are denoted by the same reference numerals, and the descriptions thereof are omitted or simplified. For example, as shown in FIG. 4, the temperature abnormality detection device 10 and the motor 1 of the second embodiment differ from those of the first embodiment in that the allowable value changing unit 14 changes the reduction rate of the allowable value for the temperature of the winding 21 more greatly as the rotation speed of the rotor 30 becomes faster.

For example, the allowable value changing unit 14 lowers the allowable value with respect to the faster rotation speed based on the fact that heat generation due to the iron loss of the rotor 30 and the viscous resistance of the bearing grease is proportional to the square of the speed. More specifically, the allowable value changing unit 14 changes the allowable value to be lower for a faster rotation speed, based on the rotor 30 and the bearing having a temperature rising element proportional to the square of the speed. For example, the allowable value changing unit 14 changes the set value to a value obtained by increasing the reduction rate in the quadratic curve.

As described above, the temperature abnormality detection device 10 and the motor 1 according to the second embodiment have the following effects.

(5) The allowable value changing unit 14 changes a reduction rate of the allowable value for the temperature of the winding 21 to be greater as the rotation speed of the rotor 30 becomes faster. Thus, it is possible to control the motor 1 in consideration of the viscous resistance or the like that increases in accordance with the rotation speed. Therefore, it is possible to control the motor 1 more appropriately.

Third Embodiment

Next, a temperature abnormality detection device 10 and a motor 1 according to a third embodiment of the present disclosure will be described. In the description of the third embodiment, the same components as those of the above-described embodiment are denoted by the same reference numerals, and descriptions thereof are omitted or simplified. The temperature abnormality detection device 10 and the motor 1 of the third embodiment differ from those in the first and second embodiments in that a comparison unit 15 compares the temperature of the winding 21 with the changed allowable value for the winding 21 based on the average value for the rotation speed at a constant time of the rotor 30.

As described above, the temperature abnormality detection device 10 and the motor 1 according to the third embodiment have the following effects.

(6) The allowable value changing unit 14 changes the allowable value for the temperature of the winding 21 based on an average value of the rotation speed of the rotor 30. Thus, even when the rotation speed of the rotor 30 temporarily changes, it is possible to suppress a sudden change in the allowable value. For example, in a case in which the rotation speed of the rotor 30 is constant at a low speed, and the rotation speed is increased temporarily, if the time at high speed is short, since the temperature of the rotor 30, bearings, or the like does not increase, it is possible to suppress an unnecessary abrupt decrease in the allowable value. Therefore, it is possible to control the motor 1 more appropriately.

Although preferred embodiments of the temperature abnormality detection device and the motor of the present disclosure have been described above, the present disclosure is not limited to the above-described embodiments, and can be modified as appropriate. For example, in the above embodiment, the rotation speed is not limited to the actual speed. The rotation speed may be a commanded speed which is commanded from numerical control (not shown).

Furthermore, the second embodiment has exemplified that the rotor 30 and bearings have a temperature rising element proportional to the square of the speed; however, the present disclosure is not limited thereto. The rotor 30 and bearings may have other temperature rising elements. The allowable value changing unit 14 may change the allowable value based on other temperature rising elements possessed by the rotor 30 and bearings.

Furthermore, in the third embodiment, the allowable value changing unit 14 changes the allowable value for the winding 21 based on the average value for the rotation speed in a fixed time of the rotor 30; however, the present disclosure is not limited thereto. The allowable value changing unit 14, for example, may change the allowable value based on the speed data obtained by applying a filter to the rotation speed of the rotor 30. More specifically, the allowable value changing unit 14 may change the allowable value based on the speed data obtained by applying a low-pass filter to the rotor rotation speed. This makes it possible to suppress an abrupt change in the allowable value. Therefore, it is possible to control the motor more appropriately.

EXPLANATION OF REFERENCE NUMERALS 1 motor
10 temperature abnormality detection device
11 temperature acquisition unit
12 speed acquisition unit
14 allowable value changing unit
15 comparison unit
16 output control unit
20 stator
21 winding
30 rotor

What is claimed is:

1. A temperature abnormality detection device that detects an abnormality in temperature of a motor including a stator and a rotor, the temperature abnormality detection device comprising:
   a temperature acquisition unit that acquires a temperature of a winding of the stator;
   a speed acquisition unit that acquires a rotation speed of the rotor;
   an allowable value changing unit that changes an allowable value for the temperature of the winding in accordance with an acquired rotation speed of the rotor;
   a comparison unit that compares an acquired temperature of the winding with a changed allowable value for the temperature of the winding based on the rotation speed of the rotor; and
   an output control unit that controls an external output of a warning signal indicating an excess of the temperature of the winding with respect to the allowable value.

2. The temperature abnormality detection device according to claim 1, wherein the allowable value changing unit reduces the allowable value for the temperature of the winding as the rotation speed of the rotor becomes faster.

3. The temperature abnormality detection device according to claim 1, wherein the allowable value changing unit keeps the allowable value for the temperature of the winding constant until the rotation speed of the rotor reaches a predetermined magnitude.

4. The temperature abnormality detection device according to claim 1, wherein the allowable value changing unit changes a reduction rate of the allowable value for the temperature of the winding to be greater as the rotation speed of the rotor becomes faster.

5. The temperature abnormality detection device according to claim 1, wherein the allowable value changing unit changes the allowable value for the temperature of the winding based on an average value of the rotation speed of the rotor.

6. The temperature abnormality detection device according to claim 1, wherein the allowable value changing unit changes the allowable value for the temperature of the winding based on speed data obtained by applying a filter to the rotation speed of the rotor.

7. A motor comprising:
   the temperature abnormality detection device according to claim 1;
   a stator including a winding; and
   a rotor.

* * * * *